United States Patent
Onggosanusi et al.

(10) Patent No.: US 7,941,164 B2
(45) Date of Patent: May 10, 2011

(54) SATELLITE POSITIONING SYSTEM RECEIVER UTILIZING BROADCAST DOPPLER INFORMATION

(75) Inventors: Eko Onggosanusi, Allen, TX (US); Anand Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 288 days.

(21) Appl. No.: 11/069,595

(22) Filed: Feb. 28, 2005

(65) Prior Publication Data

US 2005/0192032 A1    Sep. 1, 2005

Related U.S. Application Data

(60) Provisional application No. 60/549,436, filed on Mar. 1, 2004.

(51) Int. Cl.
*H04Q 7/20* (2006.01)

(52) U.S. Cl. ........................ 455/456.6; 342/357

(58) Field of Classification Search ............... 435/456.6; 342/357.09, 357.1
See application file for complete search history.

(56) References Cited

U.S. PATENT DOCUMENTS

| | | | |
|---|---|---|---|
| 4,445,118 A | 4/1984 | Taylor et al. | |
| 5,841,396 A | 11/1998 | Krasner | |
| 6,064,336 A | 5/2000 | Krasner | |
| 6,208,290 B1 | 3/2001 | Krasner | |
| 6,421,002 B2 * | 7/2002 | Krasner | 342/357.1 |
| 6,433,734 B1 * | 8/2002 | Krasner | 342/357.09 |
| 2003/0201932 A1 * | 10/2003 | Rabinowitz et al. | 342/357.09 |

* cited by examiner

*Primary Examiner* — Phuoc Doan
(74) *Attorney, Agent, or Firm* — Ronald O. Neerings; Wade James Brady, III; Frederick J. Telecky, Jr.

(57) ABSTRACT

A cellular communicating device (10). The device comprises means (22₁) for communicating bi-directional data to and from a cellular transceiver station along a bi-directional channel (30$_S$). The device also comprises means (22₂) for receiving SPS information. The device also comprises means (22₃) for receiving broadcast Doppler information from a source other than the bi-directional channel and an SPS system. Lastly, the device also comprises means (24) for determining a location fix of the electronic device in response to the SPS information and the broadcast Doppler information.

23 Claims, 2 Drawing Sheets

SATELLITE POSITIONING SYSTEM RECEIVER UTILIZING BROADCAST DOPPLER INFORMATION

CROSS-REFERENCES TO RELATED APPLICATION

This application claims priority, under 35 U.S.C. Section 119, to provisional application U.S. Ser. No. 60/549,436, filed Mar. 1, 2004, entitled "Satellite positioning system receiver utilizing independent Doppler information and satellite almanac information."

This application relates to application U.S. Ser. No. 11/026,436, (TI-38029), filed Dec. 30, 2004, and entitled "Satellite Positioning System Receiver Utilizing Time-Aiding Information from an Independent Source."

STATEMENT REGARDING FEDERALLY SPONSORED RESEARCH OR DEVELOPMENT

Not Applicable.

BACKGROUND OF THE INVENTION

The present embodiments relate to electronic devices and are more particularly directed to an electronic device with a satellite positioning system receiving function, where the device performs positioning determinations in response, in part, to broadcasted Doppler information.

Electronic devices are extremely prevalent and beneficial in today's society and are constantly being improved due to consumer and user demand. One technological example has been the mobile or cellular telephone, which has seen great advances in the last many years. These devices have evolved beyond provision of voice services alone and are now accommodating greater amounts of data and are providing various additional features, more advanced operating systems, and additional programming. For example, so-called "smart phones" are envisioned as having a large impact on upcoming generations of cellular phones. As another example, various personal digital assistants ("PDAs") are still succeeding in the marketplace and may do so for the foreseeable future. Further, the functionality of cellular phones and PDAs are now beginning to overlap with the possibility of a greater combination of the functionality of these devices into a single unit in the future.

With the advancement of the devices introduced above, various newer features are now being developed and implemented. One feature that is found in some past cellular phones and which is soon or already to be mandated in contemporary phones is the ability of the phone to report its geographical position of latitude, longitude, and altitude, as was recently driven by the E911 initiative. Per this initiative, such a feature may well serve beneficial when the phone's user places an emergency 911 call, whereby in response the phone then reports its geographic location so as to permit a better response to the call and the potential emergency that accompanies the call.

The ability of present cellular phones to report a geographic location of the phone has been provided by the phone using information from a satellite positioning system ("SPS"). Prior to its use in cellular phones, SPS has existed for decades and has been used in military and civil applications. The current SPS system includes the well-known US-owned global positioning satellite ("GPS") system or NAVSTAR and the Russia-owned Global Navigation Satellite System ("GLONASS"). Additionally, the European Union has started its effort to support SPS with an initiative to position a constellation of satellites, called the Galileo system, for completion in the future. In any event, many cellular phones are now including an SPS functionality, whereby in general that functionality receives certain SPS information from satellites in order to determine a geographic location, which is sometimes referred to as either a location fix or a position fix.

In addition to receiving information from satellites, certain SPS receivers now receive additional SPS information, for use in detecting a location fix, from other sources. As one example, so-called assisted GPS ("AGPS") has more recently been developed in an effort to expedite the ability of a GPS receiver to make its first fix determination, that is, to acquire sufficient information so as to provide a location fix (a process often called "acquisition"), after which subsequent location fixes may be ascertained relative to that first location fix. The time to make this first determination is sometimes referred to as TTFF, for "time to first fix." In traditional GPS, TTFF may be on the order of minutes, which is workable in some instances but not superior in others. However, with AGPS, the TTFF has been reduced. In AGPS, high-performance reference receivers are added to a backbone network that is part of a cellular phone network, such as in the so-called mobile switching center of the network (which is also called by other names, depending on the cellular standard at issue). These reference receivers may operate full-time and are not constrained by the requirements that are often imposed on cell phone handsets, such as low power use and constrained device size and cost. Thus, the reference receivers may constantly receive information from the SPS, such as pseudo-random codes, ephemeris data, almanac data, and timing information. This information is then collected in a system coordinator device. Accordingly, when a cellular phone places a 911 call to the cellular backbone, and with the requirement that the phone at that time needs to determine its location fix, rather than requiring the TTFF of the phone to be constrained by awaiting information from satellites, more recently there has been proposed that the cellular system provides information from the coordinator device to the particular 911-calling cellular phone. Thus, such information is received by the phone in a requested and bi-directional sense, by it calling the cellular backbone system and in response receiving the GPS information from that system; consequently, the information is received more quickly than such information may be obtained by the phone from one or more satellites. As a result, the phone is able to reduce its TTFF and report its location fix more quickly as compared to using conventional GPS.

Various approaches of AGPS or otherwise providing SPS information to a remote device from a source other than the SPS system have been proposed. As an example, in U.S. Pat. No. 6,208,290, to Krasner, and entitled "GPS receiver utilizing a communication link," there is proposed determining the approximate position of a cellular mobile unit at the cellular base station using time of arrival and determining and sending Doppler information to the mobile (or remote) unit based on that determination. As another example, in U.S. Pat. No. 6,064,336, to Krasner, and also entitled "GPS receiver utilizing a communication link," there is proposed that the satellite almanac side information is sent from the cellular base station to the mobile unit and Doppler information is then derived by the mobile from the almanac information. As still another example, in U.S. Pat. No. 5,841,396, to Krasner, and also entitled "GPS receiver utilizing a communication link," there is proposed the transmission of almanac data to a remote receiver that then determines Doppler data for certain GPS satellites. All of these approaches, therefore, require the mobile to have sufficient complexity and power so as to determine the Doppler information.

While the preceding approaches to providing SPS information to SPS-enabled devices have proven workable in certain implementations, the present inventors have observed that the preceding approaches also may provide certain drawbacks. For example, reliance on a singular source of SPS information (e.g., the cellular system) to facilitate expedited location fix determinations lacks redundancy, should the information-providing system fail or delay. As another example, AGPS may be undesirable where it is provided in a bi-directional sense and provides its information to the user device only in response to a request from the user device. As still another example, additional device complexity may be required when the mobile is expected to determine Doppler information. Finally, various of the above-described approaches are not necessarily readily advantageous when coupled into a mobile phone device. Still other examples will be ascertainable by one skilled in the art.

As a result of the preceding, there arises a need to address the drawbacks of the prior art as is achieved by the preferred embodiments described below.

BRIEF SUMMARY OF THE INVENTION

In one preferred embodiment, there is a cellular communicating device. The device comprises means for communicating bi-directional data to and from a cellular transceiver station along a bi-directional channel. The device also comprises means for receiving SPS information. The device also comprises means for receiving broadcast Doppler information from a source other than the bi-directional channel and an SPS system. Lastly, the device also comprises means for determining a location fix of the electronic device in response to the SPS information and the broadcast Doppler information.

Other aspects are also disclosed and claimed.

DETAILED DESCRIPTION OF THE INVENTION

The present invention is described below in connection with a preferred embodiment, namely as implemented into an electronic device such as a cellular telephone or a personal digital assistant ("PDA"), by ways of example. Still other electronic devices may implement the preferred embodiments, as may be evident in the wireless art such as satellite positioning system ("SPS") enabled devices, which include as a subset global positioning system ("GPS") devices and other devices introduced earlier. The present inventors believe that this invention is especially beneficial in such applications. However, the invention also may be implemented in, and provide significant benefit to, other electronic devices as well. Accordingly, it is to be understood that the following description is provided by way of example only and is not intended to limit the inventive scope.

Figure 1:
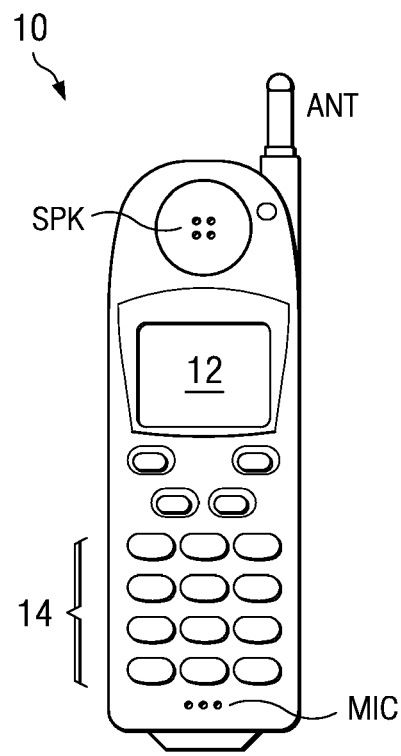
FIG. 1 illustrates a view of an example of a wireless telephone handset 10 into which a preferred embodiment is implemented.

FIG. 1 illustrates an example of a wireless telephone handset 10 into which the preferred embodiment is implemented. In this example, handset 10 includes an antenna ANT (which could be internal but is shown as external for sake of illustration), and handset 10 also provides the conventional human interface features, including a microphone MIC, a speaker SPK, a visual display 12, and a keypad 14. Each of these features in general is known, and in this regard keypad 14 includes the usual keys for a wireless telephone handset, including numeric keys 0 through 9, the * and # keys, and other keys as in conventional wireless telephone handsets. According to the preferred embodiment of the invention, handset 10 is also operable in connection with SPS information to present on visual display 12 a geographic indication of the location of handset 10, or an indication in response to a determination of the geographic location. Additionally, once handset 10 determines its location, that location also may be transmitted by handset 10 via antenna ANT to a receiving device.

Figure 2:
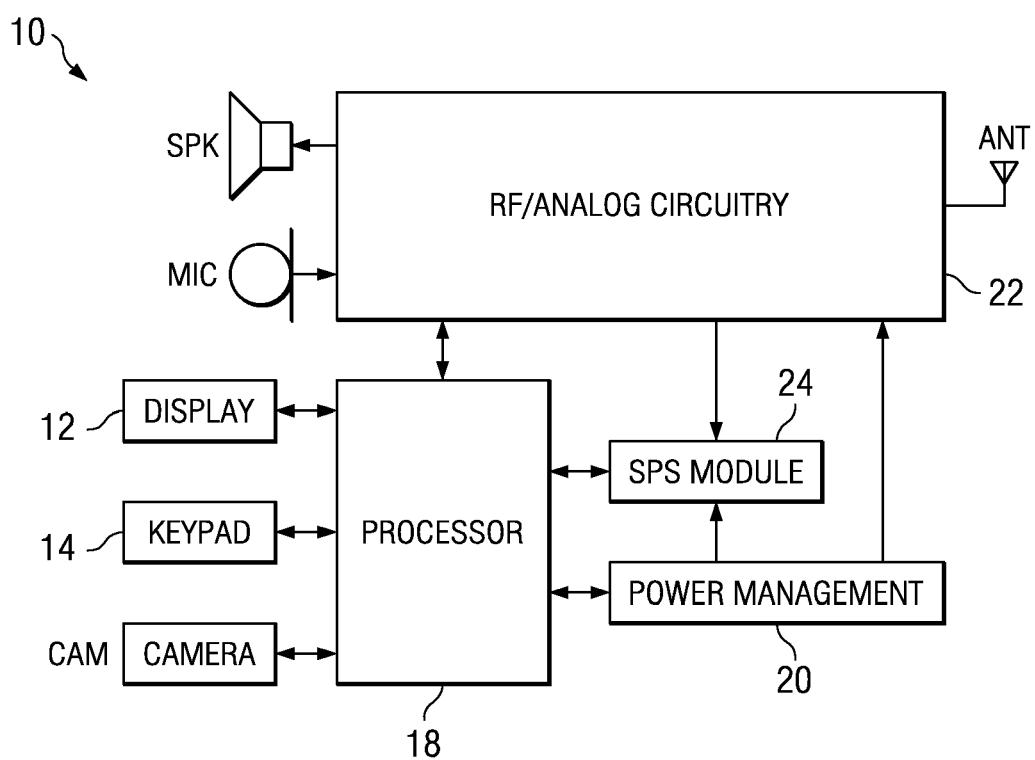
FIG. 2 illustrates an electrical block diagram of various functional features of handset 10.

Referring now to FIG. 2, the construction of an exemplary electrical block diagram architecture for handset 10 according to a preferred embodiment is now described. Of course, the particular architecture of a wireless handset (or other device within the inventive scope) may vary from that illustrated in FIG. 2, and as such the architecture of FIG. 2 is presented only by way of example.

As shown in FIG. 2, the functionality of handset 10 is generally controlled by a processor 18. Processor 18 may take various forms, including an implementation where it is embodied as a single integrated circuit that includes both a core and a digital signal processor ("DSP"). High-performance processors that are suitable for use as such a core include the advanced RISC ("reduced instruction set computer") machine ("ARM") designed by a company known as ARM Limited. Further, examples of DSPs suitable for such use include the TMS320c5x family of digital signal processors available from Texas Instruments Incorporated. In any event, the functionality of processor 18 preferably includes programmable logic, such as a microprocessor or microcontroller, which controls the operation of handset 10 according to a computer program or sequence of executable operations stored in program memory. Preferably, the program memory is on-chip with processor 18, but alternatively it may be implemented in read-only memory ("ROpM") or other storage in a separate integrated circuit. The computational capability of processor 18 depends on the level of functionality required of handset 10, including the "generation" of wireless services for which handset 10 is to be capable. As known in the art, modern wireless telephone handsets can have a great deal of functionality in addition to communication of voice data, including the capability of Internet web browsing data, email data handling, digital still and video photography, game playing, PDA functionality, and the like, as well as the SPS functionality detailed later. The DSP functionality of processor 18 performs the bulk of the digital signal processing for signals to be transmitted and signals received by handset 10. These functions include the necessary digital filtering, coding and decoding, digital modulation, and the like. Lastly, note that DSPs that are comparable in various respects are available in combined form with the above-discussed core on a single integrated circuit as a combined processor referred to by Texas Instruments Incorporated as an OMAP processor, although in present form they do not provide or support some of the SPS functions detailed later.

Continuing the example of FIG. 2, processor 18 is coupled to visual display 12 and keypad 14, each for performing well-known functionality and, where, as mentioned earlier, display 12 also may display SPS-determined location fixes. Additionally, processor 18 is shown by way of example as coupled to a camera CAM, which may provide either still or video image functionality. Processor 18 also is coupled to a power management function 20. Power management function 20 distributes regulated power supply voltages to various circuitry within handset 10 and manages functions related to charging and maintenance of the battery (not shown) of handset 10, including standby and power-down modes to conserve battery power. Handset 10 also includes radio frequency ("RF")/analog block 22, which is coupled to antenna ANT. RF/analog block 22 consumes power under control of power management function 20, and its RF aspect includes such functions as necessary to transmit and receive the RF signals at the specified frequencies to and from the cellular (or "wireless") telephone communications network that communicates with handset 10. Thus, RF block 22 is contemplated to include such functions as modulation circuitry and RF input and output drivers, and it may be constructed by one skilled in the art using various combinations of hardware and/or software as ascertainable by one skilled in the art so as to achieve the functionality described herein. By applying the necessary filtering, coding and decoding, and the like, analog circuitry in block 22 processes the signals to be transmitted (as received from microphone MIC) prior to modulation and the received signals (to be output over speaker SPK or for use in SPS determinations) after demodulation (hence in the baseband). Thus, typical functions included within the analog functionality of block 22 include an RF coder/decoder ("CODEC"), a voice CODEC, speaker amplifiers, and the like, as known in the art. As detailed later, RF/analog block 22 also includes sufficient functionality for receiving SPS Doppler information from a source independent of the SPS system.

Handset 10 also includes an SPS module 24, coupled to receive signals from RF/analog block 22 and to function in certain respects according to the art to process those signals in connection with processor 18, including SPS acquisition, tracking, and position fixing. However, as detailed later, the Doppler information received by module 24 from RF/analog block 22 and which may be used, by way of example in acquisition, is from a source that may be independent of either the bi-directional cellular voice channel or SPS system. In any event, with the information received from all sources, module 24 may process it consistent with SPS features that are now included in various cellular telephones and that process SPS signals from a receiver, or additional algorithms may be developed so as to refine the Doppler information that is received as discussed later. In general, therefore, module 24 may receive unidirectional communications from the SPS system which, as known in the SPS art, is a constellation of a number of satellites that orbit the earth at a given angle relative to the equator. Each satellite transmits coded position and timing information in a low power signal and, in response, that information may be received by any SPS-enabled device, including handset 10 (and its module 24). In the case of the latter, those signals are received by antenna ANT, converted by appropriate circuitry in RF/analog block 22, and processed by SPS module 24, either alone or in combination with the capabilities of processor 18. Moreover, this information may be supplemented by information received from the cellular system that is also communicating with handset 10; for example, as introduced earlier in the Background of the Invention section of this document, in an AGPS system, certain SPS information may be transmitted to handset 10 directly from the cellular system in response to the handset placing a 911 call, and the processing of such information therefore is not delayed while waiting to receive it from the SPS system. Still further and according to the preferred embodiment, information may be received by SPS module 24 from a source independent of either the bi-directional cellular channel or SPS system. Thus, in response to this information, module 24 preferably has a measurement engine and position engine from which a determination of the position or location fix of handset 10 is determined. This information may then be used in various contexts. For example, the location fix may be reported by handset 10 to a cellular system in the event that its user calls the emergency 911 service. In another example, the SPS information may be used in connection with a mapping (or other) program associated with the handset 10, so as to depict on display 12 the SPS-determined location of handset 10 (and its user) on a displayed map or to display other aspects that relate to the location fix of handset 10.

Figure 3:
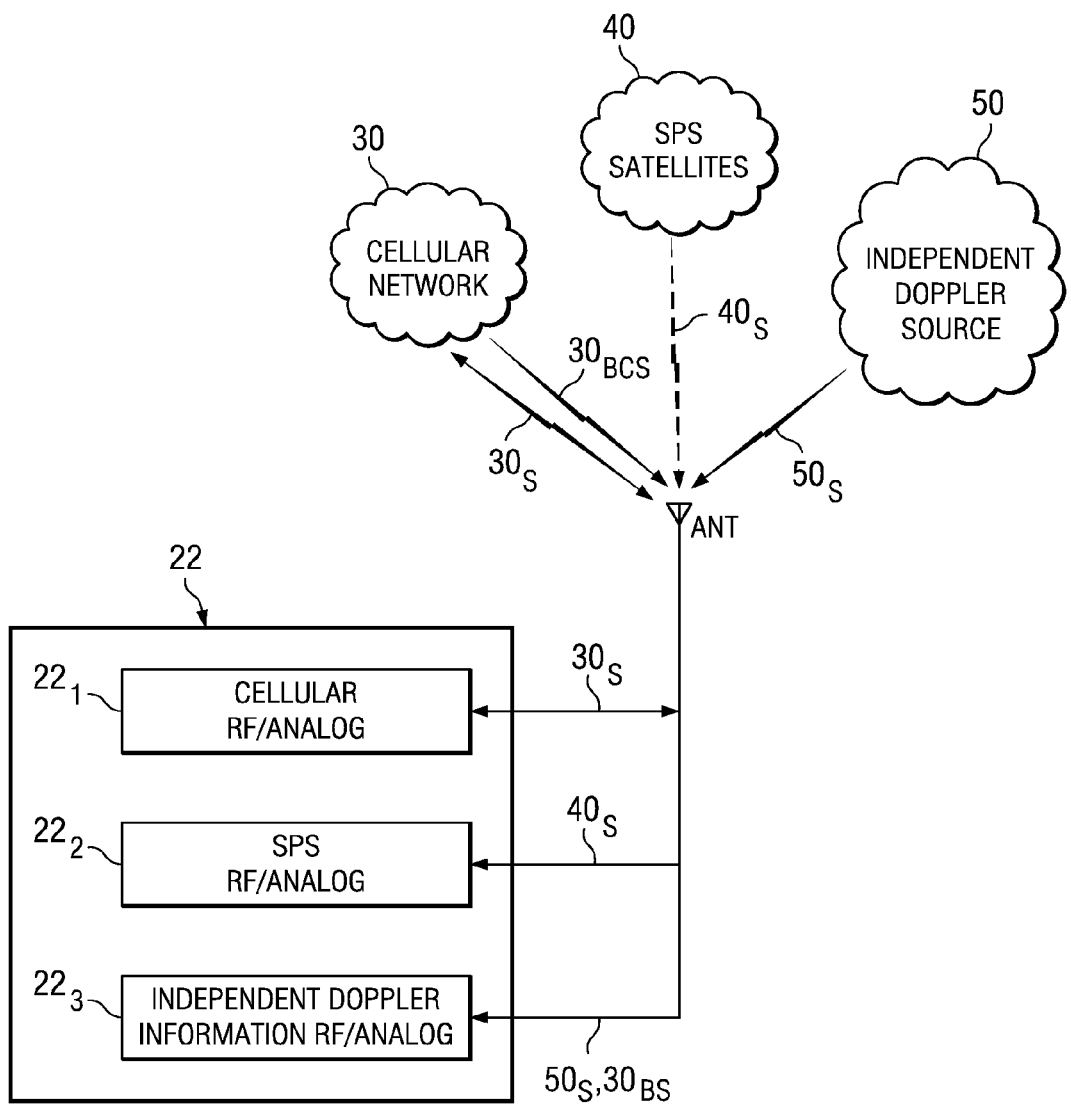
FIG. 3 illustrates an electrical block diagram of portions of the RF/analog circuitry of FIG. 2 and with emphasis on the signal path for signals received from three sources: (1) SPS satellites; (2) optionally a cellular network; and (3) an independent source providing SPS Doppler information.

FIG. 3 illustrates a diagram of RF/analog block 22 of handset 10, from FIG. 2, in greater detail, along with the multiple sources that may communicate information to block 22. Particularly, RF/analog block 22 is shown to include three sub-blocks, namely, a bi-directional cellular RF/analog block $22_1$, an SPS RF/analog block $22_2$, and an independent Doppler information RF/analog block $22_3$. Each of these blocks may communicate with a respective system, or portion thereof, also shown in FIG. 3. Particularly, FIG. 3 illustrates a cellular network system 30, an SPS satellite system 40, and an independent Doppler source system 50. In general, each of systems 30 and 40 is known in the art, and system 50 may be an existing system that is further modified to provide SPS Doppler information per the preferred embodiment, as described below. Cellular network system 30 may be of any type of cellular system that is compatible with the protocol and coding schemes of handset 10, with current examples including time division multiple access ("TDMA"), code division multiple access ("CDMA"), and global system for mobile communications ("GSM"), as well as others that are now used or will be developed. SPS satellite system 40 is intended to represent the above-introduced collection of SPS satellites, such as the 24 GPS satellites as well as satellites in any of the other SPS systems.

According to the preferred embodiment, independent Doppler source system 50 is a system capable of transmitting SPS Doppler information to handset 10 and, thus, to its RF/analog block 22 shown in FIG. 3, where that Doppler information facilitates the same SPS-determination functionality in handset 10 as is permitted currently when a mobile phone receives such information from, by way of example, an SPS system. More particularly, as known in the art, each of the SPS satellites is moving relative to the earth at a considerable rate of speed. Accordingly, associated with tracking that movement and generating meaningful distance measurements thereto are a set of Doppler information, often represented at least in part by coefficients, that may be determined and that correspond to the movement of each satellite. Indeed, in some of the prior art systems, Doppler information is determined for a subset of satellites, such as those in line-of-sight with respect to a given mobile SPS transceiver. However, in connection with the present preferred embodiments, independent Doppler source system 50 preferably determines or is informed of Doppler information with respect to all of the SPS satellites of which the remote is to be responsive. Thus, if there are 24 SPS satellites from which the remote at one time or another may determine its position, then independent Doppler source system 50 preferably determines or is informed of the Doppler information for all of those 24 satellites. Moreover, system 50 is referred to herein as an "independent time source" because preferably it broadcasts its Doppler information independent of any communications from handset 10. Thus, to the extent that handset 10 is communicating along a bi-directional channel to a cellular system, system 50 is uninformed of such a communication. Accordingly, in the preferred embodiment, the Doppler information provided by system 50 is broadcast information and, thus, is available to many different receivers irrespective of, and not in response to a request by, their present communications. In this sense, therefore, the Doppler information provided by source 50 is unidirectional, from source 50 to handset 10, as further illustrated below.

The operation of handset 10 in the context of FIG. 3 is now described. During normal cellular communications, such as the commencement of a call and the movement of handset 10 among different cells, RF/analog block $22_1$ communicates bi-directionally with cellular network system 30 according to the prior art. Toward this end, block $22_1$ includes sufficient circuitry, known in the art, for decoding and encoding the corresponding signals, as shown by the bi-directional signal $30_S$ between system 30 and block $22_1$. In addition, in one preferred embodiment, signal $30_S$ also may include SPS information (e.g., almanac data), such as by way of an AGPS communication as discussed earlier. Also during use of handset 10, SPS RF/analog block $22_2$ may receive various SPS information from SPS satellite system 40, also according to the prior art and, thus, which may include pseudo-random codes, ephemeris data, almanac data, and timing information. Toward this end, block $22_2$ includes sufficient circuitry, known in the art, for decoding and encoding the corresponding signals, as shown by the signal $40_S$ between system 40 and block $22_2$. Note, however, that signal $40_S$ is shown by way of a dashed line in FIG. 3 because in one embodiment, the SPS information, other than the Doppler information, may be received by handset 10 solely in signal $30_S$ from cellular network system 30. However, in an alternative embodiment, some of the SPS information also may be received and used by handset 10 from SPS satellite system 40 or some other system that transmits such information. In any event, therefore, handset 10 may determine SPS (e.g., GPS) location fixes per the received data.

In addition to the preceding, according to the preferred embodiment and unlike the prior art, during operation of handset 10 it also receives Doppler information from a source that is independent of signals $30_S$ and $40_S$, namely, it receives such information from independent Doppler source 50. Thus, the Doppler information is from a source that is independent of a response to a call placed by handset 10, and also may be independent from cellular network system 30 or SPS satellite system 40. Further, in a preferred embodiment, such information from independent Doppler source 50 is broadcast by another system; note that the term "broadcast" in this sense is intended to mean that the signal is repeatedly communicated (at either a set or varying period) to any compatible receiver rather than being directed to a specific receiver. With these considerations, in one preferred embodiment, independent Doppler source 50 is provided by a digital video broadcast ("DVB") tower. Thus, to the extent that DVB communications are now being developed in connection with cellular telephones, those communications are supplemented or modified to include the subject Doppler information so that it is broadcast along with video information, as independent Doppler source 50. In this case and toward this end, block $22_3$ includes sufficient functionality, known in the art, for decoding a corresponding signal, as shown by the unidirectional broadcast signal $50_S$, received by antenna ANT from system 50 and communicated to block $22_3$. Thereafter, signal $50_S$ is decoded and provided to SPS module 24. As a result, this Doppler information may be used in the same manner as is prior art Doppler information that is determined by the receiver or otherwise provided to the receiver, but of course in the present case of the preferred embodiment the Doppler information came from an independent source (e.g., DVB). Thus, there is no reliance on a cellular-requested response for this Doppler information and there is redundancy should the receiver by unable to collect the Doppler information from elsewhere or determine it on its own. In any event, with this Doppler information timely provided by independent time source 50, then coupled with the remaining optional SPS information from SPS satellite system 40 and/or from cellular network system 30, SPS module 24 may then make an expedited determination of a location fix, at a rate potentially comparable to that of prior art AGPS, but without having received AGPS Doppler information in response to a 911 call. Lastly, note also in the case where the Doppler information is communicated by a DVB tower, then the communications also may carry video and/or voice data. For these latter data types, handset 10 also preferably includes sufficient circuitry for decoding such data and presenting it to the user of handset 10, such as via display 12 and speaker SPK.

Another preferred embodiment contemplates an alternative to DVB for independent Doppler source system 50. Specifically, in this embodiment, independent Doppler source system 50 also may be from cellular network system 30. More particularly, recall in the prior art that certain information is provided from the cellular system to a mobile phone in a bi-directional, requested, and receiver-specific manner, that is, in a bi-directional channel that is first queried by the mobile phone by a 911 call, with a response from that bi-directional channel that reports the Doppler information to the querying phone, and as included in signal $30_S$ in FIG. 3. In contrast, in another preferred embodiment, cellular system 30 includes a dedicated broadcast channel that broadcasts the GPS Doppler information at repeated times and to all phones within the corresponding cell. For example, such a broadcast channel may be used in the 3GPP cellular networks like the mobile broadcast of multi-media services ("MBMS"). In FIG. 3, therefore, such a unidirectional broadcast channel signal $30_{BCS}$ is shown, in addition to the bi-directional signal $30_S$, provided by cellular network 30. Thus, both signals are received by antenna ANT, but broadcast channel signal $30_{BCS}$ is communicated to block $22_3$. In this manner, therefore, broadcast channel signal $30_{BCS}$ is available to handset 10 at any time and not in response to a particular call or request by handset 10. Thus, once more, block $22_3$ is early informed of Doppler information from a source that is independent with respect to signals $30_S$ and $40_S$. Further, in response to such information, and when coupled with the remaining SPS information, SPS module 24 may then make a determination of a location fix without having received AGPS Doppler information in response to a 911 call.

From the above it may be appreciated that the preferred embodiments provide a device that includes a satellite positioning system receiver, where the device performs positioning determinations (or "fixes") in response, in part, to Doppler information from a source other than either the SPS system or a bi-directional and query-responsive communication from a cellular system. The independently-provided Doppler information may be used by a device along with other information data provided from an AGPS or SPS (e.g., GPS) system to determine the location of the device. Various preferred embodiments are provided for the source of the independently-provided Doppler information, where each has advantages that will be ascertainable by one skilled in the art. Indeed, note that use of the DVB broadcast as described above may become more desirable as receivers move toward greater video functionality in the market and, thus, the design or certain aspects of such receivers may be incorporated into handset 10 so as to cooperate with the SPS functionality. Other advantages are also provided by the preferred embodiment As one advantage, the Doppler information may be provided in a redundant manner, that is, in addition to that Doppler information provided by the prior art, it is provided by an alternative and independent source. Thus, should one source of such information fail, the information is still provided by the other. Indeed, should the prior art source fail, then with the independent source and compatible decoding block 22₃ in handset 10, then handset 10 may still perform a portion, or after some additional time, full SPS determinations using additional information from SPS satellite system 40. As another advantage, with the implementation of the preferred embodiment, then the Doppler information need not be provided by a cellular system and, thus, such information may be removed from such a system, thereby freeing its resources for other uses. Thus, the preceding discussion and these examples should further demonstrate that while the present embodiments have been described in detail, various substitutions, modifications or alterations could be made to the descriptions set forth above without departing from the inventive scope which is defined by the following claims.

The invention claimed is:

1. A portable cellular communicating handset device, comprising:
    means for communicating bi-directional data to and from a cellular transceiver station along a bi-directional cellular channel;
    means for receiving and processing SPS information from the cellular transceiver station along the bi-directional cellular channel;
    means for receiving and processing broadcast Doppler information from a broadcast cellular channel, wherein the broadcast Doppler information is broadcast independent of any cellular communication from the portable cellular communicating handset device; and
    means for determining at the portable cellular communicating handset device a location fix of the portable cellular communicating handset device in response to the SPS information and the broadcast Doppler information.

2. The device of claim 1 wherein the means for receiving SPS information comprises means for receiving SPS information from an AGPS system.

3. The device of claim 1 wherein the means for receiving SPS information comprises means for receiving SPS information from the cellular transceiver station.

4. The device of claim 1 wherein the cellular data is selected from a set consisting of voice data, Internet data, email data, and image data.

5. The device of claim 1 and further comprising a core and a digital signal processor.

6. The device of claim 1 wherein the means for communicating, means for receiving and processing SPS information, means for receiving and processing broadcast Doppler information, and the means for determining are part of a portable cellular communicating device handset selected from a set consisting of a telephone and a personal digital assistant.

7. The device of claim 1 and further comprising means for displaying the location fix to a user.

8. The device of claim 1 wherein the cellular data is selected from a set consisting of voice data, Internet data, email data, and image data.

9. The device of claim 1 wherein the Doppler information comprises Doppler information corresponding to a plurality of satellites irrespective of a location of each of the satellites in the plurality relative to the device.

10. The device of claim 9 wherein the plurality of satellites comprises 24 SPS satellites.

11. The device of claim 1 wherein the broadcast cellular channel comprises a unidirectional cellular channel.

12. The device of claim 1 wherein the broadcast cellular channel is broadcast from the cellular transceiver station.

13. The device of claim 1 wherein the broadcast Doppler information comprises Doppler information pertaining to SPS satellites that are beyond the line of sight of the portable cellular communicating handset device.

14. The device of claim 1:
    wherein the plurality of satellites comprises 24 SPS satellites; and
    wherein the Doppler information comprises Doppler information corresponding to all 24 SPS satellites.

15. A method of operating a portable cellular communicating handset device, comprising:
    communicating bi-directional data to and from a cellular transceiver station along a bi-directional cellular channel;
    receiving and processing SPS information from the cellular transceiver station along the bi-directional cellular channel;
    receiving and processing broadcast Doppler information from a broadcast cellular channel, wherein the broadcast Doppler information is broadcast independent of any cellular communication from the portable cellular communicating handset device; and
    determining a location fix by the portable cellular communicating handset device of the portable cellular communicating handset device in response to the SPS information and the broadcast Doppler information.

16. The method of claim 15 and further comprising displaying the location fix to a user.

17. The method of claim 15 wherein the Doppler information comprises Doppler information corresponding to a plurality of satellites irrespective of a location of each of the satellites in the plurality relative to the device.

18. The method of claim 17 wherein the plurality of satellites comprises 24 SPS satellites.

19. The method of claim 15 and further comprising operating a station source to broadcast the Doppler information.

20. The method of claim 15 wherein the broadcast cellular channel comprises a unidirectional cellular channel.

21. The method of claim 15 wherein the broadcast cellular channel is broadcast from the cellular transceiver station.

22. The method of claim 15 wherein the broadcast Doppler information comprises Doppler information pertaining to SPS satellites that are beyond the line of sight of the portable cellular communicating handset device.

23. The method of claim 15:
    wherein the plurality of satellites comprises 24 SPS satellites; and
    wherein the Doppler information comprises Doppler information corresponding to all 24 SPS satellites.

* * * * *